Figure 1:
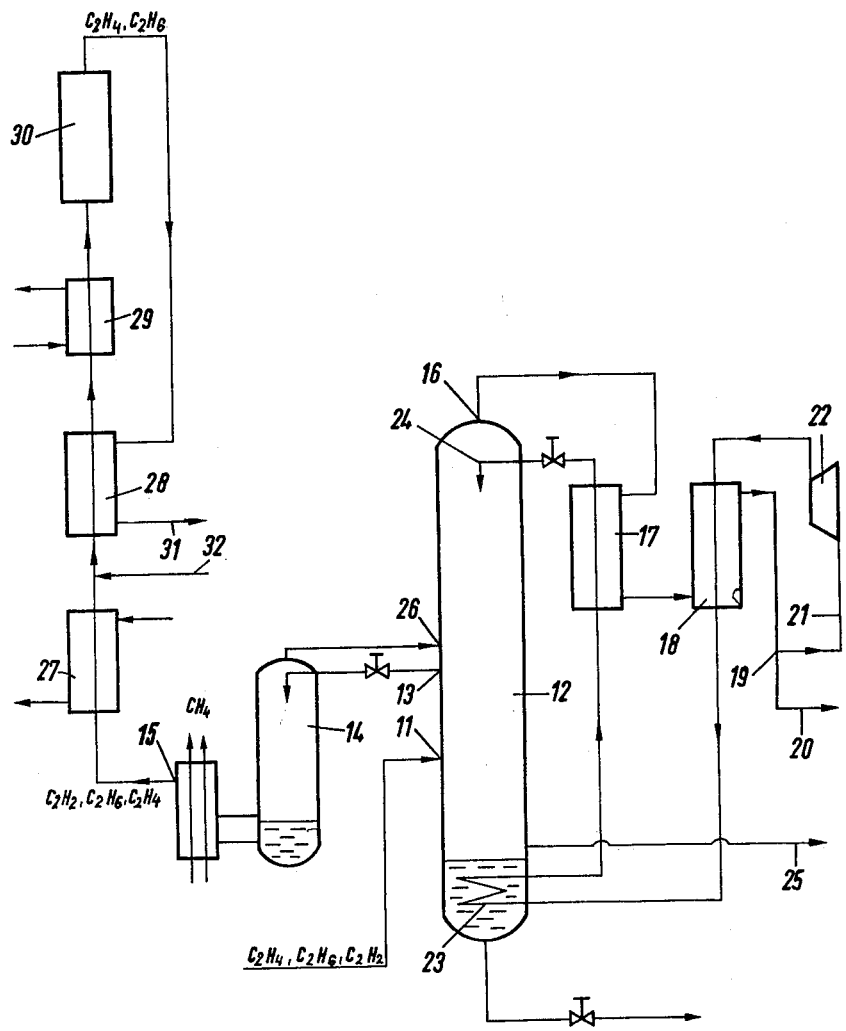

Inventor
FRIEDRICH ROTTMAYR
By Toulmin & Toulmin
Attorneys

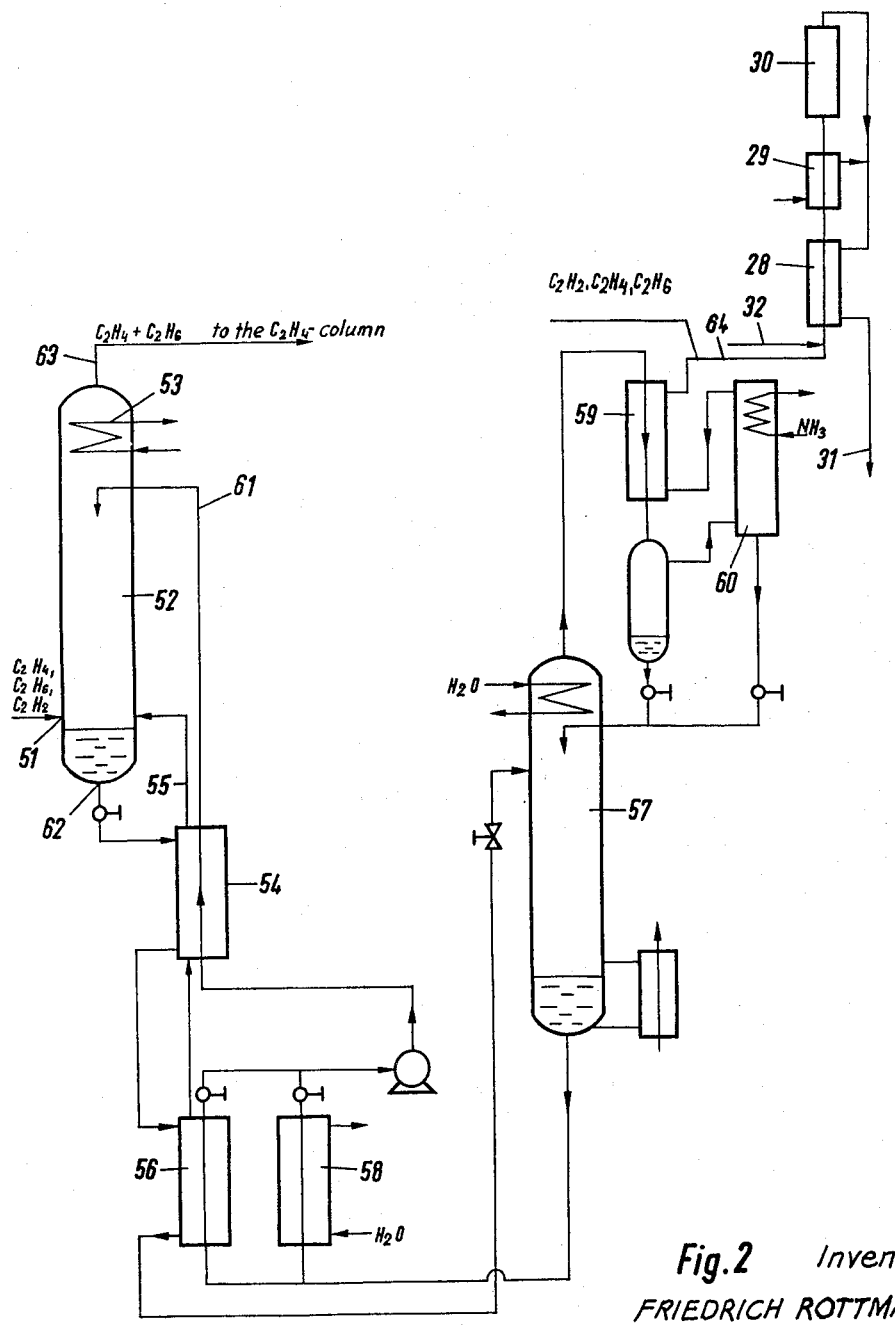
Fig.2 Inventor
FRIEDRICH ROTTMAYR
By Toulmin & Toulmin
Attorneys

United States Patent Office 3,153,679
Patented Oct. 20, 1964

3,153,679
PROCESS FOR THE PRODUCTION OF ETHYLENE FREE FROM ACETYLENE
Friedrich Rottmayr, Pullach im Isartal, near Munich, Germany, assignor to Gesellschaft für Linde's Eismaschinen Aktiengesellschaft, Hollriegelskreuth, near Munich, Germany
Filed Oct. 4, 1962, Ser. No. 228,393
Claims priority, application Germany Oct. 7, 1961
8 Claims. (Cl. 260—677)

This invention relates to an improved process for the production of ethylene, particularly ethylene containing not more than 10 parts per million of acetylene.

Ethylene, an important intermediate in the production of organic chemicals, especially polyethylene, is found as a component in refinery and coke oven gases. Furthermore, it may be produced by cracking stocks such as ethane, natural gasoline, heavy naphtha, and gas oils. From these and other sources, it is conventional practice in the production of pure ethylene, to fractionate the crude ethylene-containing gas to obtain an intermediate $C_2$ fraction comprising ethylene, ethane and some acetylene. For the purposes of this invention, this intermediate $C_2$ fraction will, hereafter, be designated as simply the $C_2$-fraction, the ratio of the various components being generally as follows.

[Basis—100 mols of $C_2$ gas]

| Component: | Mols |
|---|---|
| Ethylene | 30–99.99 |
| Ethane | 10–70 |
| Acetylene | 0.01–ca. 10 |
| Other, e.g. $C_3$ | 0–1 |

This $C_2$-fraction is then treated in order to separate and purify the eythlene. In this connection, particular attention is directed to the removal of acetylene, for if the ethylene is to be used, for example, for the synthesis of polyethylene, the highest tolerance of acetylene is 10 p.p.m.

The production of such pure ethylene from a $C_2$-fraction may be accomplished, for example, through the process described in German Patent 1,110,668 or German Patent 953,700, the former representing a pure rectification process and the latter representing a combined washing and rectifying process. In both processes which will be more fully described in a following discussion, there is formed a waste gas fraction which contains aside from acetylene and ethane, significant amounts of ethylene which are not recoverable, as these waste gas fractions have hitherto been completely burnt.

Another known method of preparing ethylene free from acetylene from the $C_2$-fraction is comprised of: heating the $C_2$-fraction which may occur at least partially in the liquefied state; transforming the acetylene after the addition of quantitative quantities of hydrogen into ethylene by means of catalytic hydrogenation; and separating the resultant mixture into ethylene and ethane by low-temperature rectification. This catalytic hydrogenation is, moreover, used for the production of ethylene free from acetylene on a large industrial scale in such a manner that the crude gas containing the entire $C_2$-fraction, high-boiling constituents and hydrogen is led immediately after the removal of the high-boiling components and prior to the low-temperature separation over a hydrogenation catalyst.

However, even hydrogenation processes have certain disadvantages. Thus, it is necessary in case the total amount of crude gas is to be treated, to operate with large amounts of catalyst on account of the relatively low acetylene content, and to employ either a separate purification step for the removal of catalyst poisons before the hydrogenation, or to renew the catalyst several times which would render the process very expensive in view of the high prices of noble metal hydrogenation catalysts.

Furthermore, even if the hydrogenation step is incorporated between the methane column and the ethylene column, there will result considerable losses of refrigerant values, as a high-temperature step is inserted between two low-temperature steps. Moreover, here too, like in the case of crude gas hydrogenation, it is mostly necessary to first free the $C_2$ fraction in a purification step from sulfur compounds, organic acids, etc., if an economically acceptable lifetime of the catalyst is to be achieved.

The progress of the hydrogenation reaction depends to a large extent upon the stoichiometric relation between acetylene and hydrogen to produce ethylene. A quantitative relationship is, however practically impossible because of the inconsistent acetylene content of the gas mixture to be hydrogenated, as well as of the fluctuating hydrogen content of the gas mixture, serving as the hydrogen supply (e.g., $N_2$–$H_2$ mixture). Consequently, if the acetylene is to be removed completely, a substantial excess of hydrogen is mandatory, thus resulting in high losses of ethylene as a result of the reaction of ethylene with the excess hydrogen.

It is the object of this invention to provide a process for the production of ethylene free from acetylene, which process offers the advantages of all of the aforedescribed processes while eliminating their disadvantages.

Upon further study of the specification and appended claims, further objects and advantages of this invention will become apparent.

The objects of this invention are attained by a process for the production of ethylene free from acetylene from $C_2$-fractions by distilling the $C_2$-fraction to obtain an ethylene fraction, an ethane fraction and a waste gas fraction consisting of a mixture of acetylene, ethylene and sometimes ethane, and then catalytically hydrogenating said waste gas fraction to remove acetylene selectively in a conventional manner without converting ethylene values to ethane, and then recycling the hydrogenated waste gas to the crude gas.

The crude gas may be considered to be any ethylene-containing gas other than pure ethylene, for example, the "crude ethylene" fraction obtained by separating coke oven gas, which fraction may consist of 40% $C_2H_4$, 35% $CH_4$, 20% $C_2H_6$ and 5% $H_2$, or gases resulting from cracking oil, benzene ethane, propane or butane.

This invention is particularly applicable to a general process of producing ethylene wherein an ethylene-containing gaseous mixture of lower aliphatic hydrocarbons is obtained, such as from compressive cracking; cooling said gaseous mixture countercurrently against separation products; and at least a partial liquefaction and rectification of the resultant cooled mixture to obtain a $C_2$-fraction; and then separating the $C_2$-fraction by rectification and/or scrubbing (absorption) into an ethylene fraction, and ethane fraction and a waste gas fraction.

FIGURES 1 and 2 depict different preferred embodiments of the invention in schematic flowsheet form.

FIGURE 1 illustrates the procedure of the process of separating a $C_2$-fraction according to DBP 1,110,668 by rectification alone (i.e., without a scrubbing step), and in cooperation with the subsequent treatment of the waste gas fraction which constitutes the invention. A $C_2$-fraction having a composition in mol percent of 82.7% ethylene, 17% ethane and 0.3% acetylene is fed at 11 into the ethylene column operating at approximately 1.5 atmospheres (absolute). At 13, an acetylene-enriched fraction of 5% acetylene, 3% ethane, and 92% ethylene is withdrawn and fed to the head of the secondary acetylene column 14. The heating of the bottom of this column is effected through heat exchange with methane and crude gas. At 15, there is withdrawn a waste gas fraction which contains about 30% acetylene, about 45% ethane, and about 25% ethylene. Thus, the entire amount of acetylene fed into colum 12 is removed. At the head of the acetylene column 14, there escapes and overhead ethylene fraction having a composition in mol percent of 3.3% acetylene, 0.7% ethane, and 96% ethylene, thus being poorer in acetylene and ethane than the product removed at 13 from the main column. This overhead vapor reenters the ethylene column 12 at 26, approximately 1 plate above the point at which the fraction rich in acetylene had been removed.

At the head of the column 12, an ethylene overhead fraction is withdrawn at 16 which contains less than 10 p.p.m. acetylene. The ethylene withdrawn at 16 is heated only in the heat exchangers 17 and 18, and at 19 is split into 2 streams, about 25% at 20 being product, and the remainder, at 21, being used as recycle ethylene. This recycle ethylene is compressed in the compressor 22, cooled in the heat exchanger 18 countercurrently with respect to the ethylene coming from the column 12, liquefied at 23 in the sump of column 12, and fed at 24, after further cooling in heat exchanger 17, as reflux liquid into column 12. Pure ethane is withdrawn at 25.

The waste gas fraction of the acetylene column 14 which contains, aside from acetylene, also ethane and ethylene, is now heated approximately to room temperature at 27 countercurrently with respect to the crude gas. At 32, the hydrogenation hydrogen, for example, in the form of an $H_2$—$N_2$ mixture, or the residual gas of an ethylene plant is admixed thereto. In heat exchanger 28, the gas to be hydrogenated is heated to approximately 150–200° C. countercurrently to the previously hydrogenated gas, led thereafter through the steam heater 29 and finally catalytically hydrogenated in reactor 30 at a temperature of approximately 200° C. The resultant mixture yields its heat in the heat exchanger 28 to the gas flowing into the reactor and is finally introduced at 31 into the crude gas compressor.

FIGURE 2 schematically illustrates the separation of a $C_2$-fraction by means of the combined scrubbing and rectifying process according to DBP 953,700 as well as the subsequent processing of the waste gas fraction.

At 51 the $C_2$-fraction is introduced at a temperature lying at or slightly above its liquefaction point, into the acetone scrubbing (absorption or washing) column 52 into which cold acetone is sprayed at 61. Above the feed point of the acetone, there is provided a condenser 53 for the purpose of liquefying part of the washed gas. The liquid trickles over several trays downward onto the uppermost acetone tray. The purpose of this reflux of liquefied ethylene-ethane-mixture free from acetone is to cool the head of the column as well as to rewash the gas in that part of the column which is above the entrance of the acetone with liquid ethylene. This part of the column above the acetone feed is, therefore, equally provided with several trays. Through the rewashing with liquid ethylene or ethylene-ethane-mixture, respectively, the acetone vapors are removed from the gas. The acetone content of the gases leaving the scrubbing column lie below the tolerable limit (less than 10 p.p.m.).

The loaded acetone is withdrawn from the scrubbing column at 62, led into the cold branch 54 of the acetone heat exchanger where it is heated with fresh acetone coming from the regenerating column 57. Hereby, part of the dissolved ethylene escapes and flows back into the scrubbing column via conduit 55.

After the countercurrent heat exchange step in 54, the heated and loaded acetone enters the warm branch 56 wherein it is heated with hot acetone to such an extent that the still dissolved ethylene is stripped as far as possible, while the acetylene remains dissolved. The freed gas is recycled countercurrently to the scrubbing column via the warm and cold branch. The acetone leaving the warm branch contains principally dissolved acetylene, and this stream is then passed into the regenerating column 57 wherein acetone is regenerated, and the resultant stripped acetone is cooled indirectly with water (cooler 58) and recycled to the scrubbing column in heat exchange with loaded cold acetone.

At the head of the acetone-regenerating column, the acetylene-containing waste gas escapes which contains, according to the composition of the gas to be washed, 50 to 90% acetylene. The rest, i.e., 10 to 50% of the waste gas, consists of a mixture of ethylene, ethane and, in case the crude $C_2$-mixture still contained some $C_3$ residues, also part of the $C_3$. The waste gas leaving the regenerating column takes along considerable amounts of acetone vapors, which are condensed in heat exchangers 59 and 60 and recycled to the head of the regenerating column. In the reliquefyer 60, the waste gas is cooled to —45° C. for the recovery of the acetone vapors.

The overhead product from the acetone scrubbing column 52 escaping at 63 consists of ethylene and ethane. It contains less than 5 p.p.m. acetylene and is separated into its components by simple and conventional rectification of a binary mixture in an ethylene distillation column.

The waste gas from the acetone regeneration step withdrawn at 64 is then heated together with the hydrogenation hydrogen added at 32 in the heat exchanger 28 and thereafter in the steam heater 29 and introduced into the reactor 30, whereby the acetylene is hydrogenated into ethylene. The mixture of ethylene and ethane leaving the reactor yields in the exchanger 28 its heat to the gas to be hydrogenated and is introduced into the crude gas compressor via conduit 31.

A modification of this process consists in first separating the ethane from the $C_2$-fraction by rectification and subjecting the resulting ethylene-acetylene mixture to the acetone wash. The waste gas of the acetone regeneration to be hydrogenated contains in that case only ethylene and acetylene.

The hydrogenation catalyst used in the preceding examples was a Pd-catalyst.

Of course, any other conventional hydrogenation catalyst can be used instead, such catalysts being disclosed for example, in Ullmann, Enzyklopädie der technischen Chemie, Bd. 10 (1958), S. 111–113, and in Ind. Eng. Chem. 52 (1960), page 901.

As to the hydrogenation temperature and pressure, again conventional operating conditions are employed, the temperature being, for example, 150–300° C., and the pressure being 1–2 atmospheres.

With respect to the ratio of hydrogen to acetylene in the hydrogenation, it is preferred that the mol ratio be about 0.7–1.5 to one mol of acetylene. Furthermore, it may be preferred that the hydrogenation be conducted so that some acetylene is left unconverted, preferably the reaction is terminated when the mol concentration of acetylene in the resultant hydrogenated gas is about 10–20%.

In general, irrespective of the method of acetylene separation, whether by rectification or gas absorption in a liquid, the content of the waste gas is variable, but for the purposes of this invention it is preferred that it generally analyzes about as follows:

| Component: | Mol percent |
|---|---|
| $C_2H_2$ | 50–90 |
| $C_2H_4$ | 5–40 |
| $C_2H_6$ | 5–40 | addition of $H_2$: 0.7 to 1.5 mols of $H_2$ to 1 mol of acetylene. If, as also disclosed in DBP 953,700, firstly the $C_2$-fraction is separated into ethane and a mixture of ethylene and acetylene by simple rectification and secondly the acetylene is scrubbed out of the mixture by a solvent, the waste gas contains only 50–90% acetylene and 10–40% ethylene. This waste gas fraction generally constitutes about 0.1–10 mol percent of the $C_2$-fraction, depending on the $C_2H_2$-content of the $C_2$-fraction.

The process of this invention combines the advantages of the scrubbing and rectifying processes as well as the advantages of the hydrogenation process and at the same time, eliminating the disadvantages of the various methods.

It is to be noted that a principal advantage of the process lies in the fact that there is no danger of losing $C_2$-hydrocarbons, which loss is inevitable in the conventional scrubbing and rectifying processes. Not only is the ethylene contained in the residual fractions of the scrubbing and rectifying processes recovered, but it is, moreover, possible to increase the ethylene output by converting the acetylene into ethylene. Through the recirculation of the hydrogenated waste fraction to the crude gas to be separated, a yield is obtained which lies, in the case of crude gases of the initially mentioned composition, between 5–10% ethylene.

In comparison with processes wherein the acetylene is removed by hydrogenation of the crude gas prior to the low-temperature separation thereof, or by hydrogenation of the $C_2$-fraction prior to the ethylene-ethane separation, the advantages of the present process are to be seen in that only a small fraction of the gas otherwise to be hydrogenated is supplied to the hydrogenation catalyst. Additionally, as the entire acetylene contained in the crude gas is enriched only in the waste gas, the partial pressure of the acetylene in the waste gas is relatively high, thereby favoring the hydrogenation reaction from both the equilibrium and rate standpoints. Moreover, as the waste gas mixture to be hydrogenated has been freed of catalyst poisons in the preceding rectification and/or washing steps, a separate purification step prior to the hydrogenation can be omitted. It is thus clear that in the present invention, there are substantial savings in investment and operating costs.

Aside from the preceding considerations, a particularly significant advantage of this invention is in the ease of operating the process inasmuch as there is no need for the waste gas to be hydrogenated to obtain an acetylene concentration of less than 10 p.p.m., nor is there any need for the removal of excess hydrogen, as the hydrogenated waste gas is merely recycled to the crude gas, and the separation process is repeated.

In other words, as a result of the quantity of gas to be hydrogenated being very small, the high concentration of acetylene to be hydrogenated, and the fact that it is not necessary to remove the acetylene quantitatively, the regulation and control of the hydrogenation reaction is considerably simplified, and the ordinarily inevitable losses of ethylene are reduced.

Still further, if the process steps are arranged in the preferred sequence of the invention, losses of refrigerant values are also eliminated, because the hydrogenation is effected only after the low-temperature separation step has been completed.

Thus, by the present process, it has become possible for the first time to obtain in the simplest and most economical manner the total $C_2$-hydrocarbon content of the crude gas, particularly the entire ethylene content, and to even increase the ethylene yield simultaneously by converting the acetylene into ethylene.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A process for the production of ethylene free from acetylene, which process comprises the steps of:
   (a) separating from a crude gas a $C_2$-fraction consisting essentially of ethylene, ethane, and acetylene;
   (b) separating said $C_2$-fraction to obtain an ethane fraction, an ethylene fraction containing up to 10 p.p.m. acetylene, and a waste gas fraction consisting essentially of acetylene, ethane and ethylene;
   (c) admixing hydrogen to said waste gas;
   (d) catalytically hydrogenating said waste gas to convert acetylene to ethylene;
   (e) recycling the resultant waste gas to the crude gas whereby the overall yield of ethylene from the crude gas is increased, the regulation and control of the hydrogenation reaction is simplified, and whereby there is a considerable improvement in the process economics of catalytically hydrogenating and removing acetylene from ethylene.

2. The process of claim 1 wherein step (b) is accomplished by rectification alone.

3. The process of claim 1 wherein step (b) is accomplished by a combination of gas absorption in acetone to remove the acetylene, and the rectification of the $C_2$-fraction to produce the ethylene and ethane fractions.

4. The process of claim 1 wherein step (a) is accomplished by compressively cracking lower aliphatic hydrocarbons, cooling the resultant cracked product stream countercurrently against the separation products, at least partially liquefying and rectifying the resultant cracked product to obtain the $C_2$-fraction.

5. A process for the production of ethylene free from acetylene, which process comprises the steps of:
   (a) separating from a crude gas a $C_2$-fraction consisting essentially of ethylene, ethane, and acetylene;
   (b) separating said $C_2$-fraction to obtain an ethane fraction, an ethylene fraction containing up to 10 p.p.m. acetylene, and a waste gas fraction consisting essentially of acetylene, ethane and ethylene;
   (c) admixing hydrogen to said waste gas;
   (d) catalytically hydrogenating said waste gas to convert acetylene to ethylene;
   (e) terminating said hydrogenation reaction before all the acetylene is converted to ethylene, thereby avoiding significant undesired conversion of ethylene to ethane; and
   (f) recycling the resultant waste gas to the crude gas whereby the overall yield of ethylene from the crude gas is increased, the regulation and control of the hydrogenation reaction is simplified, and whereby there is a considerable improvement in the process economics of catalytically hydrogenating and removing acetylene from ethylene.

6. The process of claim 5 wherein step (b) is accomplished by rectification alone.

7. The process of claim 5 wherein step (b) is accomplished by a combination of gas absorption in acetone to remove the acetylene, and the rectification of the $C_2$-fraction to produce the ethylene and ethane fractions.

8. The process of claim 5 wherein step (a) is accomplished by compressively cracking lower aliphatic hydrocarbons, cooling the resultant cracked product stream countercurrently against the separation products, at least partially liquefying and rectifying the resultant cracked product to obtain the $C_2$-fraction.

References Cited in the file of this patent
UNITED STATES PATENTS

| | | |
|---|---|---|
| 2,804,488 | Cobb | Aug. 27, 1957 |
| 2,938,934 | Williams | May 31, 1960 |
| 3,098,107 | Becker | July 16, 1963 |

OTHER REFERENCES

Reitmeier et al.: "Chemical Engineering Progress," vol. 54, No. 12, pages 48–51.